(12) United States Patent
Equit et al.

(10) Patent No.: US 9,062,779 B2
(45) Date of Patent: Jun. 23, 2015

(54) VALVE ASSEMBLY

(75) Inventors: Alexander Equit, Berlin (DE); Ralf Kettemann, Neuenstein-Kirchensall (DE)

(73) Assignee: Buerkert Werke GmbH, Ingelfingen (DE)

( * ) Notice: Subject to any disclaimer, the term of this patent is extended or adjusted under 35 U.S.C. 154(b) by 153 days.

(21) Appl. No.: 13/047,049

(22) Filed: Mar. 14, 2011

(65) Prior Publication Data

US 2011/0226367 A1 Sep. 22, 2011

(30) Foreign Application Priority Data

Mar. 16, 2010 (DE) .................... 20 2010 003 667 U

(51) Int. Cl.
| | |
|---|---|
| *F15B 13/00* | (2006.01) |
| *F16K 11/22* | (2006.01) |
| *E03B 1/00* | (2006.01) |
| *G05D 16/06* | (2006.01) |
| *F16K 1/00* | (2006.01) |
| *F16K 3/00* | (2006.01) |
| *F16K 5/00* | (2006.01) |
| *F16K 7/00* | (2006.01) |
| *F16K 11/00* | (2006.01) |

(Continued)

(52) U.S. Cl.
CPC ................ *F16K 7/14* (2013.01); *F16K 11/207* (2013.01); *F16K 11/022* (2013.01); *F16K 27/0236* (2013.01)

(58) Field of Classification Search
CPC ......... F16K 27/003; F16K 7/126; F16K 7/16; F16K 11/20; F16K 11/10

USPC .......................... 137/597, 861, 883, 884, 613
See application file for complete search history.

(56) References Cited

U.S. PATENT DOCUMENTS

| | | | |
|---|---|---|---|
| 5,706,859 | A | 1/1998 | Backlund |
| 5,971,025 | A | 10/1999 | Backlund |

(Continued)

FOREIGN PATENT DOCUMENTS

| | | |
|---|---|---|
| EP | 0684535 | 11/1995 |
| EP | 0972148 | 3/2004 |
| WO | 9913251 | 3/1999 |

OTHER PUBLICATIONS

German Search Report dated Jul. 11, 2011.

(Continued)

*Primary Examiner* — John K Fristoe, Jr.
*Assistant Examiner* — Hailey K Do
(74) *Attorney, Agent, or Firm* — Carlson, Gaskey & Olds, PC

(57) ABSTRACT

A valve assembly has a valve manifold which includes a housing having a central mixing chamber and a shell surface, and further has at least two diaphragm valves which are each adapted to be attached to a valve port provided on the shell surface. A first valve port has three openings, and the further valve ports each have at least two openings. A respective first opening of the valve ports is in direct fluid communication with the central mixing chamber and the second and third openings of the valve ports are each in fluid communication with an inflow or outflow via a duct. Each valve includes inlets or outlets which correspond with the openings of the valve ports and which are each in fluid communication with an opening. Each valve is adapted to shut or open the flow path between the first opening of a valve port and the second or third opening.

10 Claims, 5 Drawing Sheets

(51) Int. Cl.
*F16K 15/00* (2006.01)
*F16K 17/00* (2006.01)
*F16K 11/20* (2006.01)
*F16K 7/14* (2006.01)
*F16K 11/02* (2006.01)
*F16K 27/02* (2006.01)

(56) References Cited

U.S. PATENT DOCUMENTS

| | | | |
|---|---|---|---|
| 6,234,203 B1 | 5/2001 | Backlund | |
| 6,237,637 B1 | 5/2001 | Kovacs et al. | |
| 6,250,332 B1 * | 6/2001 | Backlund | 137/597 |
| 6,397,887 B1 * | 6/2002 | Crissman et al. | 137/597 |
| RE42,084 E * | 2/2011 | Backlund | 137/883 |
| 2005/0072481 A1 * | 4/2005 | Hanada et al. | 137/884 |
| 2005/0252562 A1 | 11/2005 | Muller | |
| 2007/0068584 A1 | 3/2007 | Murdock et al. | |

OTHER PUBLICATIONS

Extended European Search Report and Written Opinion for European Application No. EP 11 00 2192 mailed Nov. 5, 2013.

* cited by examiner

VALVE ASSEMBLY

RELATED APPLICATION

This application claims priority to German Application No. 20 2010 003 667.4, which was filed Mar. 16, 2010.

FIELD OF THE INVENTION

The present invention relates to a valve assembly having a valve manifold which includes a housing having a central mixing chamber and a shell surface and having at least two diaphragm valves which are each adapted to be attached to a valve port provided on the shell surface.

BACKGROUND

Valve assemblies of this type are used for mixing different liquids or gases. The valve manifold has a plurality of inflows through which different liquids or gases can be supplied, and one or more outflows through which the liquids or gases can be drained from the valve manifold. The inflows into the central mixing chamber and the outflows out of the central mixing chamber are controlled by diaphragm valves which can shut off the inflows into or the outflows from the central mixing chamber.

EP 0 972 148 B1, for example, discloses a diaphragm valve which is adapted to individually shut or open two inflows to and two outflows out of a central chamber, so that two inflows or outflows can be controlled by a common valve. A drawback of this design is that the central mixing chamber and the inflows and outflows are difficult to access, making maintenance and cleaning work very complicated. Above all when employed in the food industry and for operations in germ-free or sterile environments, a simple and rapid cleaning of a valve assembly is required.

Therefore it is important to provide a valve assembly which allows a simpler cleaning and maintenance of the valve manifold.

SUMMARY

A valve assembly includes a valve manifold with a housing having a central mixing chamber and a shell surface. The valve assembly includes at least two diaphragm valves which are each adapted to be attached to a valve port provided on the shell surface. A first valve port has three openings, and the additional valve ports each have at least two openings. A respective first opening of the valve ports is in direct fluid communication with the central mixing chamber and second and third openings of the valve ports are each in fluid communication with an inflow or outflow via a duct. Each valve includes inlets or outlets which correspond with the openings of the valve ports and are each in fluid communication with an opening. Each valve is adapted to shut or open the flow path between the first opening of a valve port and the second or third opening. The valves are not integrated in the valve manifold here, but are mounted on an outside of the valve manifold, so that they can be exchanged or dismounted for maintenance purposes in a simple fashion. The liquids or gases are conducted through the inflows into the manifold to the respective openings of the valve ports and flow from there via the respective valve and the first opening of the valve port to arrive in the mixing chamber. Since the valves are arranged on the outside of the valve manifold, rather than being integrated in the valve manifold, they can be simply dismounted and exchanged. In addition, with the valve in the dismounted condition, a simple cleaning of the valve chamber and of the ducts adjoining the respective valve port is possible since they are directly accessible from the valve port.

Preferably, the second valve port and any additional valve ports have three openings each, so that each valve can be made use of for shutting or opening two inflows or outflows. When each valve port is provided with three openings, a plurality of liquids or gases can be mixed in the valve assembly. Using two valves, which can control the inflow from four openings to the central mixing chamber, it is possible, for example, to control three inflows and one outflow, so that up to three liquids can be mixed using two valves.

The shell surface of the valve manifold has at least two side faces, for example, each having a respective valve port provided thereon. These side faces are configured in such a way that a valve can be sealingly applied to the valve manifold from the outside.

The side faces may be arranged evenly distributed on a periphery of the shell surface, which enhances the accessibility of the individual valves.

It is, for instance, conceivable that two side faces are provided which are disposed diametrically opposite each other.

The valve ports may also be arranged to be offset in the direction of a longitudinal axis of the housing. This allows, for one thing, a more compact valve manifold to be manufactured since the valves may be arranged, for example, so as to mutually overlap as viewed in the direction of the longitudinal axis. But the valve ports may also be arranged to be offset in order to optimize a flow path through the valve manifold.

In one example, a bottom of the central mixing chamber has a slope, in relation to a plane arranged perpendicularly to a longitudinal axis of the housing, towards a first opening of the first valve port. In the installed condition, the longitudinal axis of the housing is arranged substantially vertically, so that the plane arranged perpendicularly to the longitudinal axis is disposed horizontally. The bottom of the central mixing chamber accordingly has a slope relative to the horizontal line, so that any liquid present in the central mixing chamber will flow out of the mixing chamber and to the first valve port, following gravity. The central mixing chamber is thus of a self-emptying design and can be completely emptied when the valve is in the open condition, so that, for example after a cleaning or rinsing of the central mixing chamber, no residues will be left behind in the mixing chamber.

To ensure that the liquid is further drained from the central mixing chamber or the valve manifold, at least one opening of the first valve port is in fluid communication with an outflow. Upon opening of the appropriate valve between the opening that communicates with the outflow and the central mixing chamber, a self-emptying of the central mixing chamber takes place since the liquid, following gravity, can flow out of the inclined mixing chamber via the first valve port toward the outflow. To ensure drainage from the central mixing chamber, the opening of the first valve port connected with the outflow is arranged at a lower point than a lowermost point of the mixing chamber.

In relation to a plane arranged perpendicularly to a longitudinal axis of the housing, the ducts which are in fluid communication with an outflow have a slope from the respective valve port toward the outflow. This ensures that a liquid can flow off from the valve through the respective opening toward the outflow.

In one example, the ducts which are in fluid communication with an inflow have a slope, in relation to a plane arranged perpendicularly to a longitudinal axis of the housing, from the inflow to the respective opening of the valve port. With the valves in the open condition, a self-cleaning function is thus obtained for the entire valve manifold since a liquid can flow off from the valve manifold automatically. Liquids are guided via the inclined inflows through the valves and to the central mixing chamber, and from the inclined mixing chamber via the valves to the outflow. With the valves open, therefore no residues of a liquid will remain behind in the valve manifold.

It is also conceivable, for example, that the valve manifold has an external port provided thereon which is in direct fluid communication with the mixing chamber via a duct. For cleaning the mixing chamber or for introducing a rinsing medium it has so far been necessary to remove one of the ports from the valve manifold. Feeding of the rinsing medium is effected via a port and a valve into the mixing chamber. Any liquid residues contained in the inflow and/or in the valve will be lost or need to be flushed out additionally. After cleaning and connecting the ports it is necessary to fill the dead spaces and/or the valves again. Owing to the external port, a rinsing medium can be introduced through the external port directly into the mixing chamber, which allows a complete cleaning of only the mixing chamber and an outflow communicating with the mixing chamber, so that in a further mixing process in the mixing chamber, no residues of the previous mixing process can reach the mixture. The remaining ducts and also the valves need not be rinsed, as a result of which any liquids contained therein need not be unnecessarily disposed of and will not be lost.

The openings of a valve port may be arranged one behind the other in the direction of the longitudinal axis, which means that the openings are one on top of the other in the mounted state of the valve manifold. This ensures a gravity-induced flow of the liquids between the individual openings of a valve port.

But it is also conceivable that the openings of a valve port are arranged side by side in the direction of the longitudinal axis, that is, in the mounted state the openings are next to each other horizontally.

BRIEF DESCRIPTION OF THE DRAWINGS

Further advantages and features will be apparent from the description below in conjunction with the accompanying drawings, in which.

DETAILED DESCRIPTION

Figure 1:
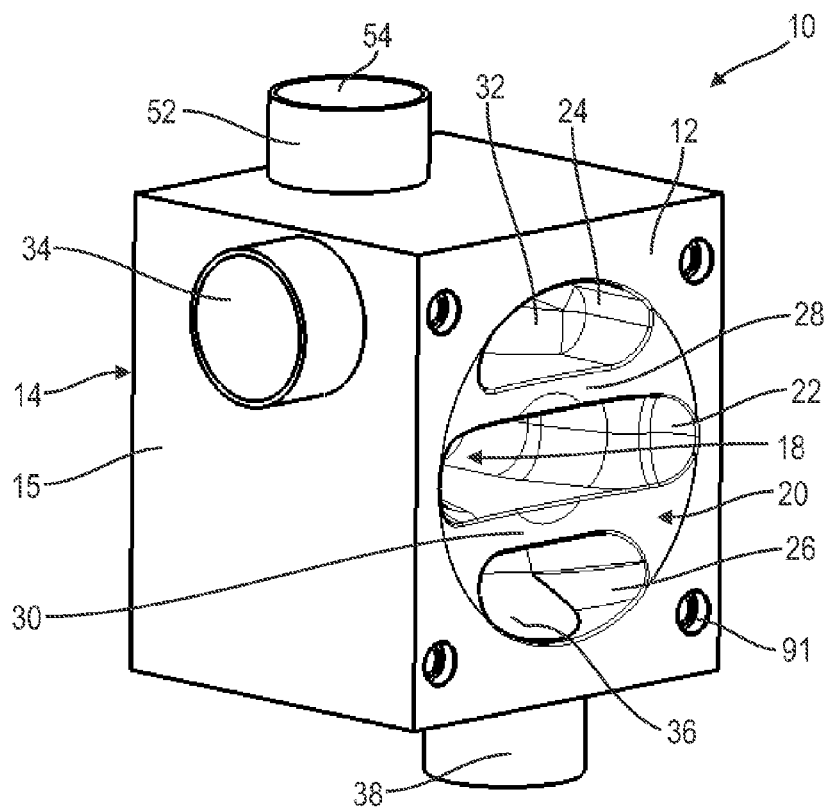
FIG. 1 shows a first embodiment of a valve manifold for an assembly according to the invention.
Figure 2:
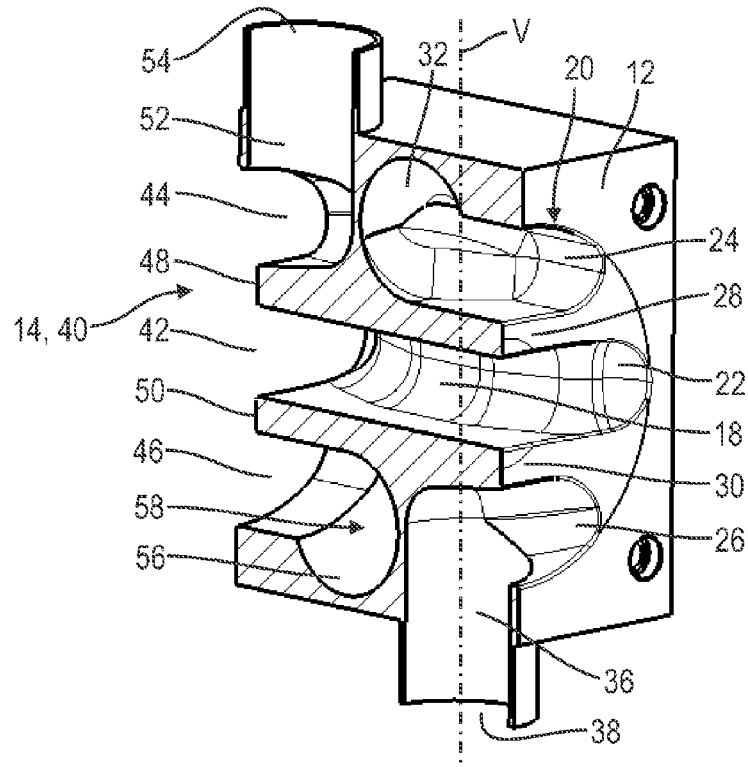
FIG. 2 shows a vertical sectional view of the valve manifold of FIG. 1.

The first embodiment of a valve manifold 10 shown in FIGS. 1 and 2 has a central mixing chamber 18 for mixing different liquids or gases, and two side faces 12, 14 which are arranged here in a diametrically opposed relationship on the shell surface 15 of the valve manifold 10.

Provided on the first side face 12 is a first valve port 20 which has three openings 22, 24, 26 which are each separated from each other by webs 28, 30. The first opening 22 is in direct fluid communication with the central mixing chamber 18. The second opening 24 communicates with an inflow 34 via a duct 32. The third opening 26 communicates with an outflow 38 via a duct 36.

Ports that are arranged fluidically upstream of the central mixing chamber 18 in the installed state of the valve manifold 10, that is, are arranged above the central mixing chamber 18 as related to a vertical longitudinal axis V in the installed state of the valve manifold, are referred to as inflows here. Ports that are arranged fluidically downstream of the central mixing chamber 18, that is, are located below the central mixing chamber 18 as related to the vertical longitudinal axis V in the installed state, are correspondingly referred to as outflows. But it is also conceivable to feed a liquid into the valve manifold 10 via an outflow, i.e. a port arranged below the central mixing chamber 18.

By analogy with the first side face 12, the second side face 14 has a second valve port 40 provided thereon which has a first opening 42, a second opening 44, and a third opening 46 which are each separated from each other by webs 48, 50. Here, too, the first opening 42 is in direct fluid communication with the central mixing chamber 18. The second opening 44 communicates with an inflow 54 via a duct 52. The third opening 46 communicates with an outflow 58 via a duct 56.

Each side face 12, 14 is provided with attachment devices 91, in this case boreholes, to attach a diaphragm valve to the respective valve port 20, 40. The function of the diaphragm valve will be explained below with reference to the first valve port 20:

The diaphragm valve has a diaphragm which can be pressed both against the first web 28 and against the second web 30 by a control. When the diaphragm is pressed against both webs 28, 30, the diaphragm valve shuts off the complete valve port 20, so that all openings 22, 24, 26 are shut off. When the diaphragm is pressed only against the first web 28, the first opening 22 and the third opening 26 are in fluid communication. When the diaphragm is pressed against the second web 30, the first opening 22 is in fluid communication with the second opening 24. When the diaphragm does not rest against either of the first web 28 and the second web 30, all three of the openings 22, 24, 26 are in fluid communication with each other.

Each valve or each valve port 20, 40 can thus be used to control two inflows or outflows 34, 38, 54, 58 each. In the valve manifold shown here, four outflows or inflows 34, 38, 54, 58 can therefore be controlled using only two valves. Since a medium can be introduced into the central mixing chamber 18 via each of the inflows 34, 54 or outflows 38, 58, it is possible to feed a liquid into the central mixing chamber 18 via three inflows (assuming that at least one outflow is necessary). As a result, a mixing of up to three liquids is possible using only two valves.

For cleaning the valve manifold 10, a cleaning medium is introduced into the valve manifold via an inflow 34, 54 or an outflow 38, 58. Subsequently, the valves are opened to drain the cleaning medium. To prevent the cleaning medium or any other medium from causing any impurities in the central mixing chamber 18 or in the valve manifold 10, no residues of the cleaning medium or other medium may remain in the valve manifold after the cleaning process. This is evidenced by using a riboflavin test, for example. In a riboflavin test the entire valve manifold 10 is sprayed with a highly adhesive, fluorescent liquid and is tested for any residues of the fluorescent liquid after a cleaning cycle.

By switching the valves appropriately, a cross flow-through from the inflow 34 to the outflow 58 and subsequently from the inflow 54 to the outflow 38 is possible in the valve manifold according to the first embodiment. In this way, the interior space of the valve manifold can be completely cleaned, which is a great advantage over the prior art.

Figure 3:
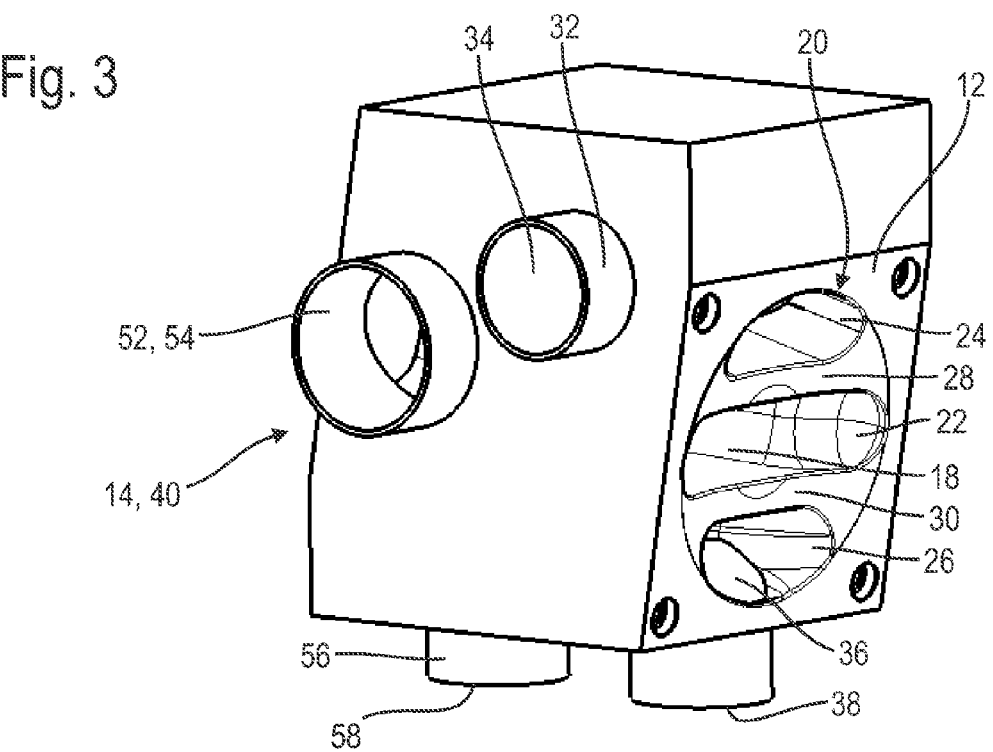
FIG. 3 shows a second embodiment of a valve manifold for a valve assembly according to the invention.
Figure 4:
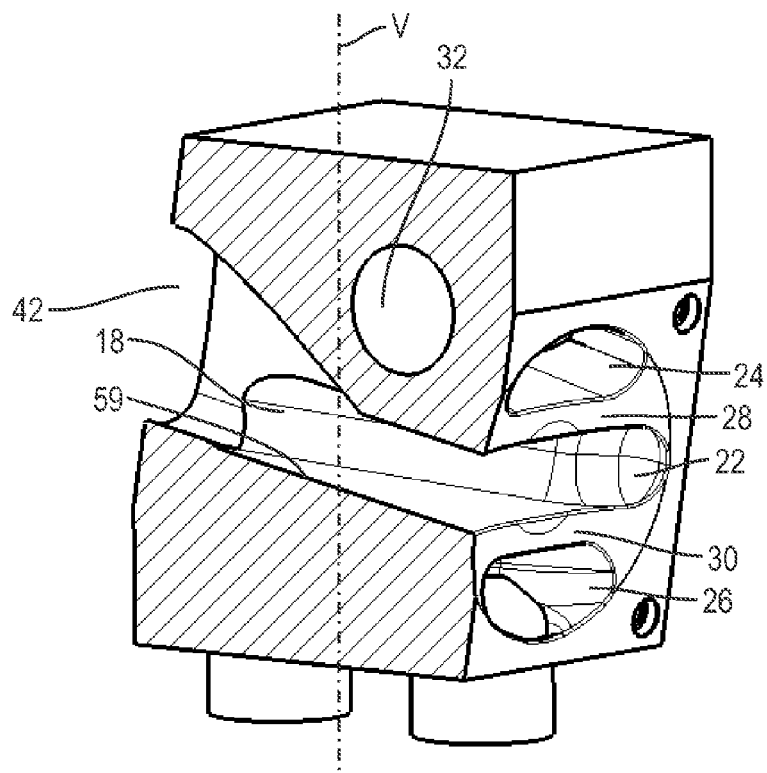
FIG. 4 shows a vertical sectional view of the valve manifold of FIG. 3.
Figure 5:
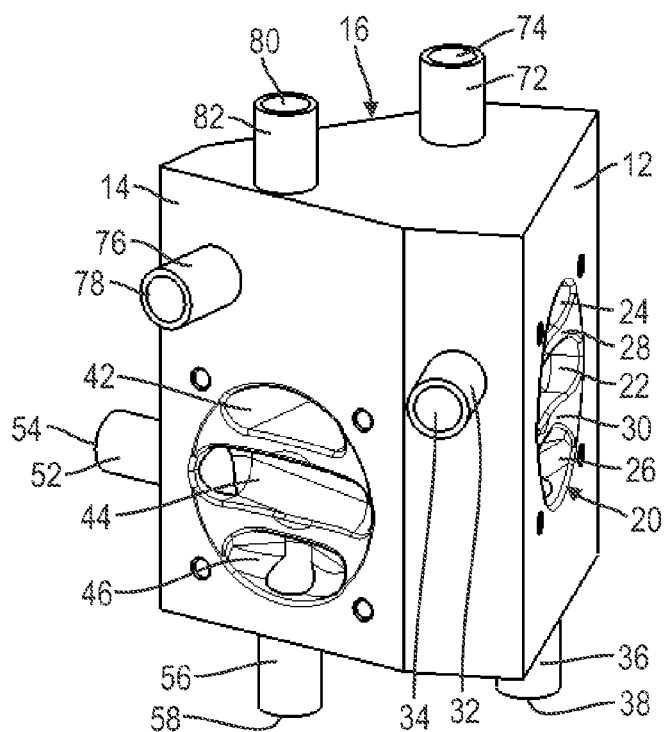
FIG. 5 shows a third embodiment of a valve manifold.

FIGS. 3 and 4 show a second embodiment of the valve manifold 10, which substantially corresponds to the valve manifold shown in FIGS. 1 and 2 with regard to its structure. However, unlike in the first embodiment, the inflow 34, which communicates with the second opening 24 of the first valve port, is provided on the shell surface 15 of the valve manifold 10.

The valve manifold 10 here includes a central mixing chamber 18 having a bottom 59 which has a slope in relation to a plane arranged perpendicularly to the vertical longitudinal axis V of the valve manifold 10. The bottom 59 of the mixing chamber 18 is inclined toward the first opening 22 of the first valve port 20, so that when the valves are open, a medium, following gravity, flows from the central mixing chamber to the first opening 22 of the first valve port 20. With the valve in the open condition, the medium can flow from the first opening 22 into the third opening 26 and thus flow off to the outflow 38. The central mixing chamber 18 is therefore self-emptying when the valves are open, i.e. no further operating steps are required for cleaning or for a complete emptying of the central mixing chamber 18.

The ducts 32, 36, 52, 56 likewise each show a slope to the respective valve port 20, 40. Upon opening of the valves, the ducts 32, 52, following gravity, empty themselves into the central mixing chamber 18 via the respective valve port 20, 40. Owing to the slope of the bottom 59, the central mixing chamber 18 empties itself to the third opening 26 of the first valve port 20 and thus into the outflow 38.

The ducts 32, 36, 52, 56 and the bottom 59 of the central mixing chamber 18 here have a constant slope or a slope that constantly increases towards the respective valve port 20, 40, i.e. the ducts 32, 36, 52, 56 and the central mixing chamber 18 do not have any valleys in which any residual liquids may collect.

This means that when the valves are fully open, the valve manifold 10 is self-emptying, i.e. upon opening of the valves, a complete emptying of the valve manifold 10 takes place. In a riboflavin test, no liquid residues could be detected in the valve manifold 10 after a cleaning process.

FIGS. 5 to 9 show a third embodiment of a valve manifold 10 having a central mixing chamber 18. The valve manifold 10 shown here has three side faces 12, 14, 16 each having a respective valve port 20, 40, 60 arranged thereon.

The structure of the first valve port 20 substantially corresponds to that of the first valve port 20 illustrated in FIGS. 3 and 4. The valve port has three openings 22, 24, 26 which are separated from each other by webs 28, 30. The first opening 22 is in fluid communication with the central mixing chamber 18. The second opening 24 communicates with an inflow 34 via a duct 32, and the third opening 26 is in fluid communication with an outflow 38 via a duct 36. As can be seen in particular in FIG. 6, the second opening 24 communicates with a further inflow 35 via an additional duct 33.

The second valve port 40 is vertically offset here in relation to the first valve port 20, that is, it is located below the first valve port 20. Deviating from the exemplary embodiment illustrated in FIGS. 3 and 4, here the first opening 42 which communicates with the central mixing chamber 18 is arranged in the vertical direction above the second and third openings 44, 46. Here too, the second opening 44 is in communication with an inflow 54 via a duct 52, the inflow 54 being provided on the shell surface 15. The third opening 46 communicates with an outflow 58 via a duct 56.

Figure 6:
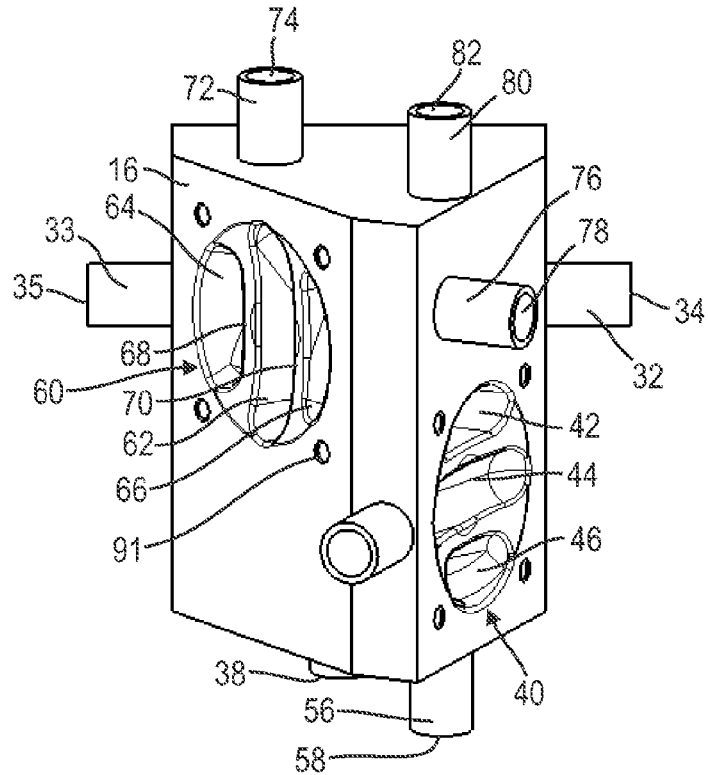
FIG. 6 shows a second view of the valve manifold of FIG. 5.
Figure 7:
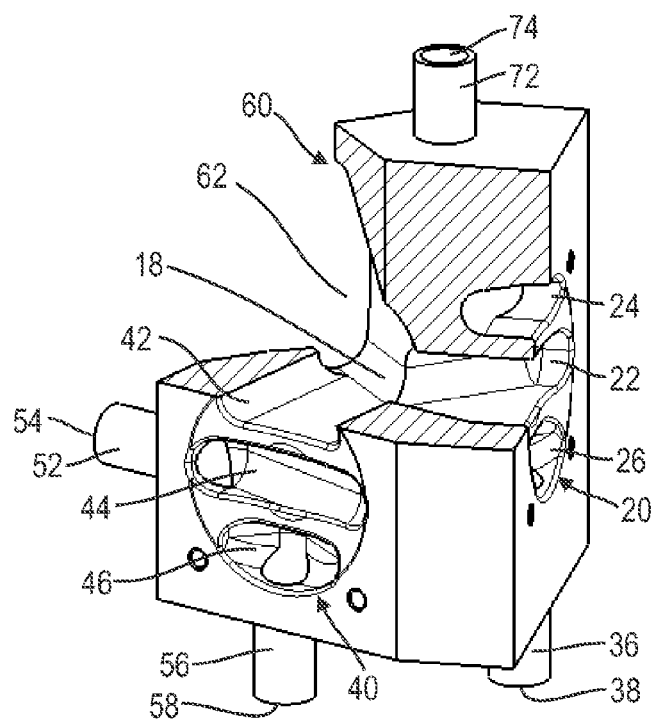
FIG. 7 shows a partial sectional view of the valve manifold of FIG. 5.
Figure 8:
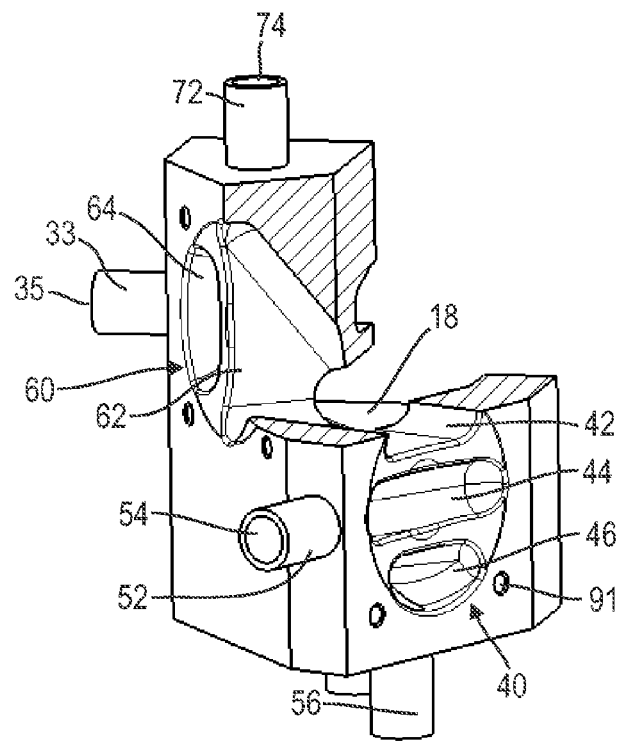
FIG. 8 shows a second partial sectional view of the valve manifold of FIG. 5.
Figure 9:
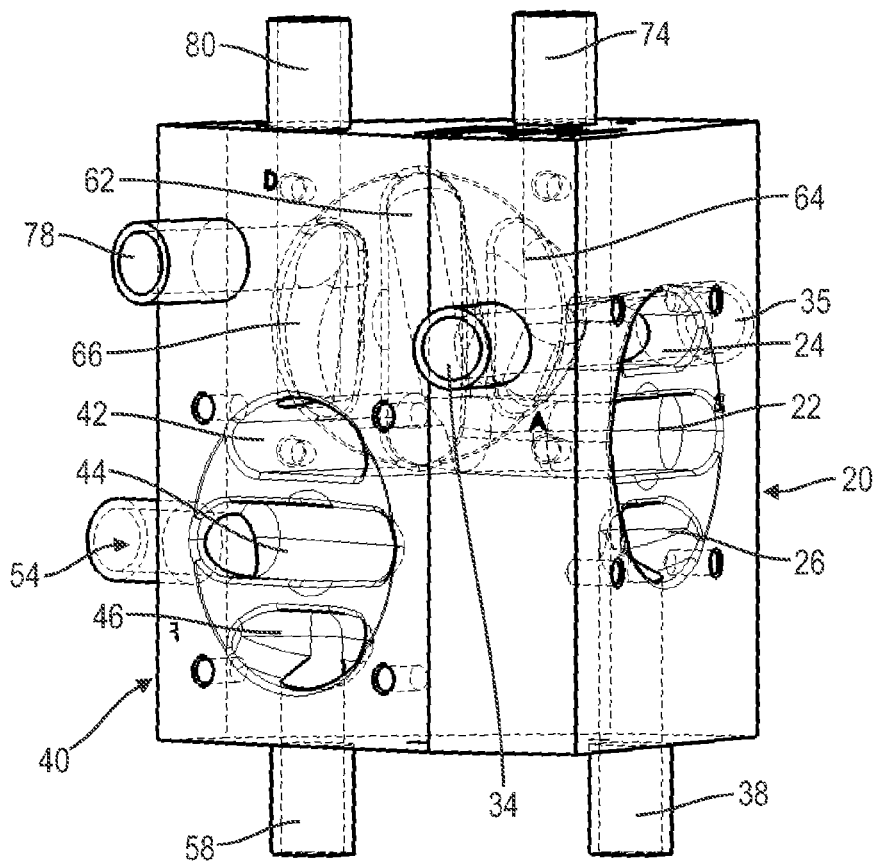
FIG. 9 shows a complete view of the valve manifold of FIG. 5.

As can be seen in particular in FIG. 6, the third valve port 60 likewise has three openings 62, 64, 66 which, in contrast to the first valve port 20 and the second valve port 40, are arranged side by side here, that is, the webs between the openings 62, 64, 66 extend in the direction of the vertical longitudinal axis V. Here, too, the first opening 62 is in fluid communication with the central mixing chamber 18. The second opening 64 and the third opening 66 are each in communication with an inflow 74, 78 via a duct 72, 76.

This means that the valve manifold 10 shown here has a total of six ports, or seven, as the case may be, which can be controlled by three valves. Assuming that one outflow is provided for the mixed liquid, it is therefore possible to introduce different liquids into the central mixing chamber 18 via five or six ports and to mix them, using three valves.

The advantage of the third embodiment according to FIGS. 5 to 9 over the second embodiment according to FIGS. 3 and 4 consists in that it is easier to clean.

In the valve manifold 10 illustrated in FIGS. 3 and 4, cleaning of the mixing chamber 18 requires, for one thing, removal of a port to be able to introduce the cleaning medium into the valve manifold. For another, a complete emptying of the valve manifold, i.e. including the valves and all outflows and inflows, is required.

Usually, however, it is only necessary to rinse the central mixing chamber 18 in order to avoid, in a new mixing process, any impurities caused by residues from the previous mixing process.

The valve manifold 10 illustrated in FIGS. 5 to 9 additionally has an external port 80 on the top side. This external port 80 is in direct fluid communication with the mixing chamber 18 via a duct 82. A cleaning medium can be directly introduced into the central mixing chamber 18 via this external port. To rinse the mixing chamber 18, it is merely required to open an outflow connected with the mixing chamber, preferably the lowermost outflow in the vertical direction.

In this way, no complete emptying of the ducts of the valve manifold 10 is necessary, so that a substantial amount of liquid may be saved. Further, the cleaning may be effected considerably faster and in a less complicated manner since it is not necessary to remove another port in order to introduce the rinsing fluid into the mixing chamber 18. For rinsing the mixing chamber 18 it is only required to open the communication between the first opening 22 and the third opening 26 on the first valve port 20, so that the cleaning medium can flow from the central mixing chamber 18 into the outflow 38.

Figure 10:
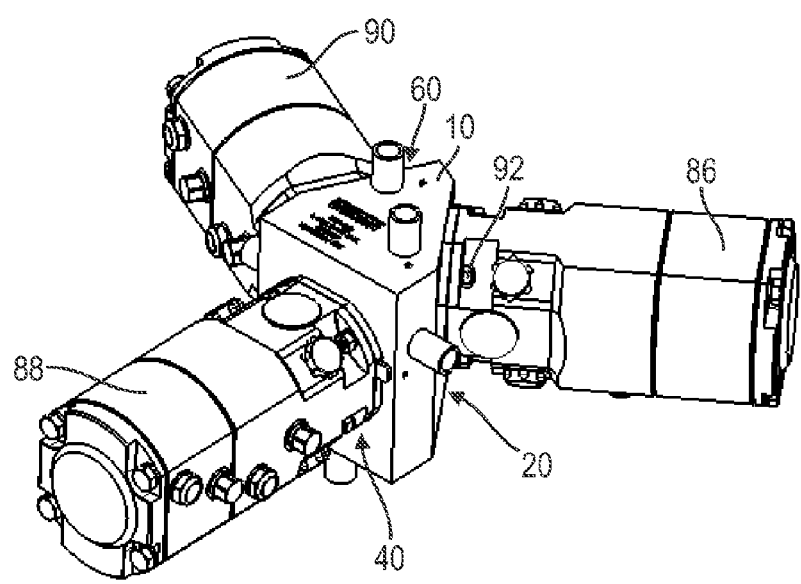
FIG. 10 shows a valve assembly according to the invention with the valve manifold of FIG. 5.

FIG. 10 shows a valve assembly 84 with a valve manifold 10 according to the invention. Each valve port 20, 40, 60 has a diaphragm valve 86, 88, 90 attached to it. Using suitable attachment structure, in this case bolts 92 for example, the diaphragm valves 86, 88, 90 are each attached to the attachment devices 91 on the side faces 12, 14, 16. Here, the side faces 12, 14, 16 are disposed evenly distributed on the periphery of the shell surface, so that as large an amount of space as possible is provided around the valves 86, 88, 90 or the side faces 12, 14, 16 for mounting, maintenance and/or dismounting of the valves 86, 88, 90. Deviating from this, however, any other desired arrangement of the valve ports 20, 40, 60 is also conceivable. Also, unlike in the exemplary embodiments illustrated here, the valve manifold 10 may also include more than three side faces 12, 14, 16.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A valve manifold comprising:
a body having at least first, second, and third sides;
a mixing chamber formed within the body;
at least first and second valve ports arranged on an external surface of the body such that the first valve port is formed on the external surface of the first side and the second valve port is formed on the external surface of the second side, and wherein each valve port of the at least first and second valve ports is adapted to receive a diaphragm valve;
wherein each valve port of the at least first and second valve ports includes a first opening, a second opening, and a third opening wherein each first opening is in direct fluid communication with the mixing chamber, each second opening is in fluid communication with a dedicated second opening flow duct, wherein the second opening flow duct is arranged above the mixing chamber, and each third opening is in fluid communication with a dedicated third opening flow duct;
and wherein each first opening and second opening are separated by a first web accessible at each of a respective one of the at least first and second valve ports for a respective diaphragm valve, and wherein each first opening and third opening are separated by a second web accessible at the respective one of the at least first and second valve ports for the respective diaphragm valve; and
wherein said body is configured such that during operation the mixing chamber has a bottom which extends with a first slope towards the first opening of the at least one of the first and second valve ports, and wherein a first fluid connection in fluid communication with the second opening flow duct of the at least one of the first and second valve ports extends with a second slope towards the second opening of at least one of the first and second valve ports, and a second fluid connection extends with a third slope towards the third opening flow duct of the at least one of the first and second valve ports, and wherein each of the first, second, and third slopes are different from 0°.

2. The valve manifold of claim 1 wherein the body comprises a third fluid connection which extends in the body from an external port directly into the mixing chamber, wherein the external port is arranged on an external surface of the body and is separate from each of the at least first and second valve ports.

3. The valve manifold of claim 2 wherein the third fluid connection has a fourth slope that is constant.

4. The valve manifold of claim 1 wherein the first, second, and third slopes are each in the order of 3° to 10° with respect to a horizontal plane.

5. The valve manifold of claim 1 including an attachment device mounted to each of the at least first and second valve ports.

6. The valve manifold of claim 1 wherein the bottom of the mixing chamber extends with the second slope from the first opening of the at least one of the first and second valve ports towards the first opening of another of the at least first and second valve ports.

7. The valve manifold of claim 1 wherein the body includes a top surface and a bottom surface with the at least first, second, and third sides forming peripheral surfaces that extend between the top and bottom surfaces, and wherein the second opening flow duct is arranged at the top surface of the body, the third opening flow duct is arranged at the bottom surface of the body, and the first and second webs are arranged generally perpendicularly to the top and bottom surfaces of the body.

8. The valve manifold of claim 1 wherein one diaphragm valve is connected to each of the at least first and second valve ports, each diaphragm valve having a diaphragm and a drive to selectively urge the diaphragm against the first web, against the second web, or against both of the first and second webs.

9. A valve manifold comprising:
a body having at least first, second, and third sides;
a mixing chamber formed within the body;
at least first and second valve ports arranged on an external surface of the body such that the first valve port is formed on the external surface of the first side and the second valve port is formed on the external surface of the second side, and wherein each valve port of the at least first and second valve ports is adapted to receive a diaphragm valve:
wherein each valve port of the at least first and second valve ports includes a first opening, a second opening, and a third opening wherein each first opening is in direct fluid communication with the mixing chamber, each second opening is in fluid communication with a dedicated second opening flow duct, and each third opening is in fluid communication with a dedicated third opening flow duct, wherein the third opening flow duct is arranged below the mixing chamber;
and wherein each first opening and second opening are separated by a first web accessible at each of a respective one of the at least first and second valve ports for a respective diaphragm valve, and wherein each first opening and third opening are separated by a second web accessible at the respective one of the at least first and second valve ports for the respective diaphragm valve; and
wherein said body is configured such that during operation the mixing chamber has a bottom which extends with a first slope towards the first opening of the at least one of the first and second valve ports, and wherein a first fluid connection in fluid communication with the second opening flow duct of the at least one of the first and second valve ports extends with a second slope towards the second opening of at least one of the first and second valve ports, and a second fluid connection extends with a third slope towards the third opening flow duct of the at least one of the first and second valve ports, and wherein each of the first, second, and third slopes are different from 0°.

10. A valve manifold comprising;
a body having at least first, second, and third sides wherein the body includes a top surface and a bottom surface with the at least first, second, and third sides forming peripheral surfaces that extend between the top and bottom surfaces;
a mixing chamber formed within the body;
at least first and second valve ports arranged on an external surface of the body such that the first valve port is formed on the external surface of the first side and the second valve port is formed on the external surface of the second side, and wherein each valve port of the at least first and second valve ports is adapted to receive a diaphragm valve;
wherein each valve port of the at least first and second valve ports includes a first opening, a second opening, and a third opening wherein each first opening is in direct fluid communication with the mixing chamber, each second opening is in fluid communication with a dedicated second opening flow duct, and each third opening is in fluid communication with a dedicated third opening flow duct, and wherein the second opening flow duct is arranged at the top surface of the body and the third opening flow duct is arranged at the bottom surface of the body;

and wherein each first opening and second opening are separated by a first web accessible at each of a respective one of the at least first and second valve ports for a respective diaphragm valve, and wherein each first opening and third opening are separated by a second web accessible at the respective one of the at least first and second valve ports for the respective diaphragm valve, and the first and second webs are arranged generally in parallel with the top and bottom surfaces of the body; and wherein said body is configured such that during operation the mixing chamber has a bottom which extends with a first slope towards the first opening of the at least one of the first and second valve ports, and wherein a first fluid connection in fluid communication with the second opening flow duct of the at least one of the first and second valve ports extends with a second slope towards the second opening of at least one of the first and second valve ports, and a second fluid connection extends with a third slope towards the third opening flow duct of the at least one of the first and second valve ports, and wherein each of the first, second, and third slopes are different from 0°.

* * * * *